United States Patent [19]
Fertner

[11] Patent Number: 5,742,642
[45] Date of Patent: Apr. 21, 1998

[54] SIGNAL PROCESSING METHOD AND APPARATUS FOR REDUCING EQUALIZER ERROR

[75] Inventor: Antoni Fertner, Solna, Sweden

[73] Assignee: Telefonaktiebolaget LM Ericsson, Stockholm, Sweden

[21] Appl. No.: 739,752

[22] Filed: Oct. 29, 1996

[51] Int. Cl.$^6$ .................................................. H03H 7/30
[52] U.S. Cl. ........................ 375/233; 375/348; 375/350; 364/724.2
[58] Field of Search ................................. 375/233, 346, 375/348, 350, 232, 230, 229, 317; 333/18; 364/724.2, 724.19, 724.01; 455/296, 307

[56] References Cited

U.S. PATENT DOCUMENTS

| Re. 31,351 | 8/1983 | Falconer | 375/233 |
|---|---|---|---|
| 3,879,664 | 4/1975 | Monsen | 375/345 |
| 3,974,449 | 8/1976 | Falconer | 333/18 |
| 4,271,525 | 6/1981 | Watanabe | 375/232 |
| 4,468,786 | 8/1984 | Davis | 375/229 |
| 5,233,635 | 8/1993 | Henriksson et al. | 375/233 |
| 5,349,609 | 9/1994 | Tsujimoto | 375/348 |
| 5,481,564 | 1/1996 | Kakuishi et al. | 375/232 |
| 5,513,216 | 4/1996 | Gadot et al. | 375/233 |
| 5,517,527 | 5/1996 | Yu | 375/233 |
| 5,572,262 | 11/1996 | Ghosh | 348/607 |
| 5,604,769 | 2/1997 | Wang | 375/233 |

FOREIGN PATENT DOCUMENTS

| 0 738 062 A | 10/1996 | European Pat. Off. . |
| 2 260 068 | 3/1993 | United Kingdom . |

OTHER PUBLICATIONS

*IEEE Transactions on Communications*, vol. 35, No. 9, Sep. 1987, New York, US, pp. 877–887, XP002005146, Picchi & Prati, "Blind equalization and carrier recovery using a 'stop-and-go' decision-directed algorithm".

*IEEE Trans. Inform. Theory*, vol. IT–20, pp. 490–497, Jul. 1974, D.L. Duttweiler, J.E. Mazo, and D.G. Messerschmitt, "An upper bound on the error probability in decision feedback equalizers".

(List continued on next page.)

*Primary Examiner*—Stephen Chin
*Assistant Examiner*—Betsy L. Deppe
*Attorney, Agent, or Firm*—Nixon & Vanderhye P.C.

[57] ABSTRACT

A decision feedback equalizer (DFE) is controlled co equalize a current signal sample for intersymbol interference and/or other distortion caused by the communications channel. An incorrect symbol decision by the DFE is detected and corrected to prevent propagation of the error with possible adverse effects on subsequent DFE decisions. More specifically, an error threshold is determined based on an expected bit error rate and a first postcursor value $h_1$ of the communications channel impulse response. The decision feedback equalizer determines an intersymbol interference (ISI) component in a first, current sample of the signal being processed. The ISI component is subtracted from the current sample to generate an equalized sample. A corresponding symbol value is detected using that equalized sample. A symbol error is calculated by subtracting the equalized sample from the detected symbol value. The symbol error is compared with the error threshold. If the magnitude of the symbol error is less than the equalizer error threshold, the probability of a symbol decision error is low, and no preventive or corrective action is taken. However, if the magnitude of the symbol error is greater than the error threshold, a temporary symbol value is generated in place of the detected symbol value. The next, second sample is received and its corresponding symbol value is detected using this temporary symbol value. The second symbol error resulting from the use of the temporary symbol value is then determined. Using that second symbol error, a corrected, final symbol value is determined for the first sample that ensures symbol decision errors are not propagated through the DFE.

29 Claims, 5 Drawing Sheets

OTHER PUBLICATIONS

*IEEE Trans. Commun.*, vol. 37, No. 11, pp. 1126–1135, Nov. 1989, R.A. Kennedy, B.D.O. Anderson, and R.R. Bitmead, "Channels leading to rapid error recovery for decision feedback equalizers".

*Electr. Lett.*, vol. 24, No. 17, pp. 1084–1085, 18 Aug. 1988, E. Dahlman and B. Gudmundson, "Performance improvement in decision feedback equalizers by using 'soft decisions'".

*IEEE J. Select. Areas Commun.*, vol. SAC-2, pp. 731–742, Sep. 1984, K. Wesolowski and J.G. Proakis, "A simplified two-stage equalizer with a reduced number of multiplications for data transmission over voiceband telephone links".

*IEEE Trans. Commun.*, vol. COM-33, No. 5, pp. 425–432, May 1985, K. Wesolowski, "On the performance and convergence of the adaptive canceller of intersymbol interference in data transmission".

*Proc IEE Proc. F, Commun., Radar, Signal Process.*, vol. 132, No. 7, pp. 561–566, 1985, J.J. O'Reilly and A.M. de Oliveira Duarte, "Error propagation in decision feedback receivers".

*Proc IEE Proc. F, Commun., Radar, Signal Process.*, vol. 132, No. 7, pp. 567–575, 1985, A.M. de Oliveira Duarte and J.J. O'Reilly, "Simplified technique for bounding error statistics for DFB receivers".

*IEEE Trans. Commun.*, vol. COM-35, pp. 846–848, Aug. 1987, R.A. Kennedy and B.D.O. Anderson, "Error recovery of decision feedback equalizers on exponential impulse response channels".

*Bell Syst. Tech. J.*, vol. 70, pp. 1997–2021, Nov. 1981, A. Gersho and T.L. Lim, "Adaptive cancellation of intersymbol interference for data transmission".

*IEEE Trans. Commun.*, vol. COM-24, No. 9, pp. 970–977, Sep. 1976, A. Cantoni and P. Butler, "Stability of decision feedback inverses".

*IEEE Trans. Inform. Theory*, vol. 39, No. 1, pp. 145–156, Jan. 1993, S.A. Alketar and N.C. Beaulieu, "Upper bounds to the error probability of decision feedback equalization".

*IEEE Trans. Commun.*, vol. 42, No. 10, Oct. 1994, N.C. Beaulieu, "Bounds of recovery times of decision feedback equalizers".

SIGNAL PROCESSING METHOD AND APPARATUS FOR REDUCING EQUALIZER ERROR

FIELD OF THE INVENTION

The invention relates to decision feedback equalizers, and more particularly, to decision error propagation through a decision feedback equalizer.

BACKGROUND AND SUMMARY OF THE INVENTION

Equalizers are commonly used in digital communication systems where digital symbols are transmitted from a digital transmitter over a communications channel and received at a digital receiver. Transmission of coded binary data requires symbol synchronization at the digital data receiver. In general, the receiver clock of a receiving transceiver interface are adjusted to track and compensate for frequency drift between the oscillators used in the transmitter located at the opposite end of the communications loop as well as to track and compensate for changes in the transmission media. Digital receivers rely on signal processing to recover the transmitted digital information. The received signal is sampled at discrete time intervals and converted to its digital representation. A timing recovery function synchronizes the receiver clock so that received symbols can be sampled at an appropriate sampling instance to determine their correct values, (e.g., an optimum sampling instance would be at the peak of the sampled pulse or pulse amplitude modulated (PAM) codes). This task is complicated, however, because the received pulses are distorted.

One source of disturbance is echoes from transmitted pulses from the transmitting portion of the receiver coupled across a hybrid circuit and detected at the receiver input. Such transmit pulse echoes are typically removed by an echo canceller, e.g., a transversal filter which models the signal and subtracts it from the received signal. But even after the echo canceller removes the echoes of transmitted pulses, the received pulses are still distorted as a result of the transmission path characteristics, e.g., attenuated, and most significantly, intersymbol interference (ISI) is introduced. The result is that relatively square, narrow, transmitted pulses are "smeared," i.e., distorted and widened, by the time they are received. More particularly, the "tail" of one symbol pulse extends into the time period of the next transmitted symbol pulse making it difficult to determine the correct amplitude of the pulse actually transmitted during the symbol period. Another factor is that the communications channel is not usually known initially—at least not precisely. Even if the channel is known initially, it may change with time. Therefore, the varying channel conditions must be monitored closely during transmission.

The general process of correcting the channel induced distortion is called equalization. Decision feedback equalizers are used (as explained more fully below) to suppress intersymbol interference caused by the "tails" of previously transmitted symbols according to the continuously estimated impulse response of the communications channel.

Many communication applications require high immunity against noise with extremely low bit error rates. Such bit error rates are difficult to obtain given unknown delays, attenuation, dispersion, noise, intersymbol interference (ISI) introduced by and/or on the communications channel. The $10^{-7}$ bit error rate for ISDN interfaces to subscriber loops, for example, does not leave much tolerance, especially when the channel and/or transceiver parameters change. It is one thing to deliver this low bit error rate most of the time; it is a more challenging task to maintain it all the time through such changes and adjustments. In practical systems, the response of the channel is not known with sufficient precision to allow for a receiver design that will compensate for the intersymbol interference all of the time.

Figure 1:
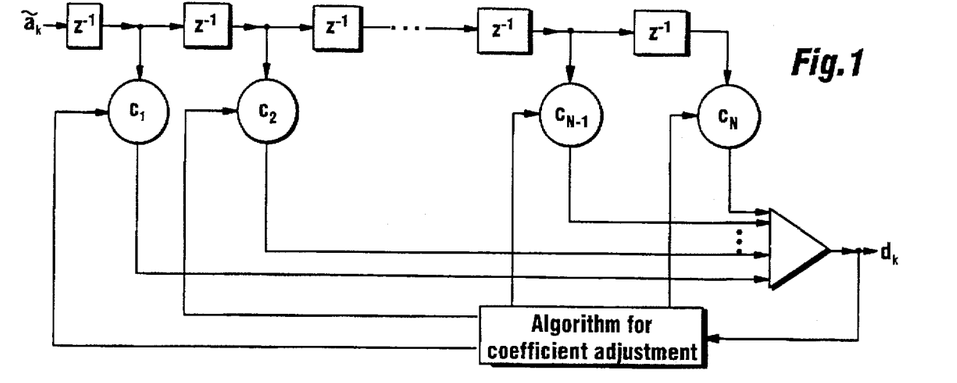
FIG. 1 is a diagram of a transversal filter which may be used as the feedback filter in a decision feedback equalizer.

In practice, a feedback equalizer filter for compensating for ISI at the receiver contains various parameters, e.g., digital filter taps or coefficients, that are adjusted on the basis of estimated channel characteristics. A common choice for an equalizer feedback filter is a transversal filter such as that shown in FIG. 1. A transversal filter is essentially a delay line with several delays $z^{-1}$, where delay $z^{-1}$ corresponds in a digital communications application to the symbol duration. The tap coefficients, $C_n$, are set to subtract the effects of interference from symbols that are adjacent in time to the desired symbol. The criteria for selecting or adjusting the $C_n$ coefficients is typically based on the minimization of either peak distortion or mean squared distortion. A preferred approach employs a least mean squares (LMS) algorithm to adjust the coefficients.

There are two general types of automatic equalization. The first, preset equalization, transmits a training sequence that is compared at the receiver with a locally generated sequence. The differences between the two sequences are used to set the filter coefficients $C_n$. With the second method, adaptive equalization, the coefficients are continually and automatically adjusted directly from the transmitted data.

Decision feedback equalization uses previous symbol decisions, combined with the knowledge of the channel response, to form an estimate of the intersymbol interference at the current symbol decision instant due to previously transmitted symbols. This estimate is then subtracted from the received signal with the hope of reducing the influence of ISI in the decision value. If the previous equalizer decisions are all correct and the channel response is known perfectly, the ISI caused by previously detected symbols would be eliminated entirely. Unfortunately, this ideal situation is rarely if ever achieved.

Figure 2:
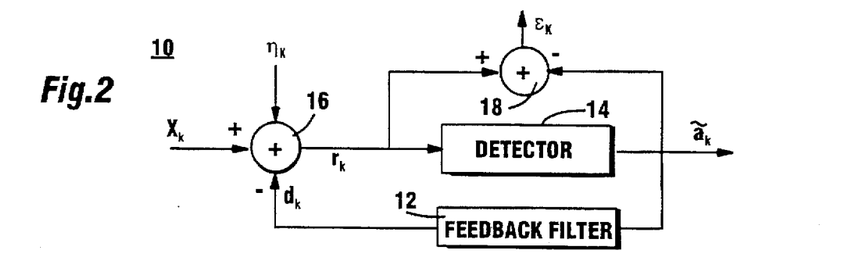
FIG. 2 is a function block diagram generally illustrating a decision feedback equalizer.

Reference is now made to the decision feedback equalizer (DFE) 10 shown in FIG. 2. The signal to be equalized, e.g., a received signal $x_k$, filter 12 which attempts to model the ISI due to previously transmitted symbols. The transversal filter structure shown in FIG. 1 may be used to implement the feedback filter 12 in FIG. 2. The number of filter taps in the feedback filter 12 determines the number of previous symbol decisions which affect the current DFE decisions. The output $r_k$ of combiner 16 ideally should correspond to just the received signal for the current symbol. Detector 14 detects the value of the symbol that best corresponds to $r_k$ to generate a detected symbol signal $\alpha_k$. A difference between the input to the detector $r_k$ and the output of the detector $\alpha_k$ is determined in combiner 18 to generate a symbol error $\epsilon_k$. Again, in an ideal system, this symbol error should essentially be zero.

Thus, a decision feedback equalizer operates by feeding back past data estimates or decisions. Unfortunately, these decisions may not correspond to the actual input data sequence, especially if the DFE has recently made decision errors. Because past decisions are used to cancel the ISI of the real data, DFE decision errors are likely "propagated" and may well lead to an "avalanche" of subsequent erroneous decisions. As a result of DFE error propagation, the postcursors of earlier symbols are (1) not eliminated by the DFE and (2) added to the current symbol estimate. Adding these DFE errors to the current DFE symbol estimate increases the likelihood of future decision errors in the DFE. The bottom line is that propagating DFE errors dramatically increase the bit error rate. Higher bit error rates may reduce the communication system "throughput" with increasing numbers of erroneous data packets needing to be retransmitted.

A number of articles have identified the existence of DFE error propagation. In this regard, the reader's attention is directed to the following articles:

*IEEE Transactions on Communications*, Vol. 37, No. 11, Nov. 1989, pp. 1126–1135, Rodney A. Kennedy et al., "Channels Leading to Rapid Error Recovery for Decision Feedback Equalizers"

*Electronics Letters*, Vol. 24, No. 17, Aug. 18, 1988, pp. 1084–1085, E. Dahlman et al., "Performance Improvement in Decision Feedback Equalisers by Using '"Soft Decision"'"

*IEEE Transactions on Information Theory*, Vol. IT-20, No. 4, Jul. 1974, pp. 490–497, Donald L. Duttweiler et al., "An Upper Bound on the Error Probability in Decision-Feedback Equalization"

*IEEE Transactions on Information Theory*, Vol. 39, No. 1, Jan. 1993, pp. 145–156, Shirish A. Altekar et al., "Upper Bounds to the Error Probability of Decision Feedback Equalization"

*IEEE Transactions on Communications*, Vol. 42, No. 10, Oct. 1994, pp. 2786–2794, Norman C. Beaulieu, "Bounds on Recovery Times of Decision Feedback Equalizers"

*IEEE PROCEEDINGS*, Vol. 132, Pt. F., No. 7, December 1985, pp. 561–566, J. J. O'Reilly, et al., "Error propagation in decision feedback receivers"

*IEEE PROCEEDINGS*, Vol. 132, Pt. F., No. 7, Dec. 1985, pp. 567–575, A.M. de Oliveira Duarte et al., "Simplified technique for bounding error statistics for DFB receivers"

It is an object of the present invention to provide a technique which promptly detects when a DFE decision error has occurred.

It is also an object of the present invention, once a DFE decision error has been detected, to prevent the propagation of that DFE decision error.

It is a further object of the present invention, once a DFE decision error has been detected, to quickly determine the correct symbol value and replace the erroneously decided symbol value so as to prevent decision error propagation through the DFE.

It is a further object of the present invention to achieve these and other objects using a technique which is readily implemented in hardware and/or software.

The present invention provides a method for operating a decision feedback equalizer which equalizes the current signal sample for intersymbol interference caused by previous signal samples. An incorrect symbol decision by the DFE is detected and corrected to prevent propagation of the error with possible adverse effects on subsequent DFE decisions.

More specifically, an equalizer error threshold is determined based on the expected bit error rate and a first postcursor value $h_1$ of the channel impulse response. The decision feedback equalizer determines an intersymbol interference component in a first current sample. The ISI component is subtracted from the current sample to generate an equalized sample. A corresponding symbol value is detected using that equalized sample. A symbol error is calculated by subtracting the equalized sample from the detected symbol value. The symbol error is compared with an error threshold. If the magnitude of the symbol error is less than the error threshold, the probability of an equalization error is low, and no preventive or corrective action is taken. However, if the magnitude of the symbol error is greater than the error threshold, a temporary symbol value is generated in place of the detected symbol value. The next, second sample is received, and its corresponding symbol value is detected using this temporary symbol value. The second symbol error resulting from the use of the temporary symbol value is then determined. Using that second symbol error, a corrected symbol value is determined for the first error. The corrected symbol value ensures that DFE decision errors are not propagated. Choosing symbol decision thresholds as the temporary symbol values (rather than the symbol values themselves) guarantees in a noise free environment that decision errors will not propagate. This also maximizes the probability that decision errors will not propagate if noise is present.

The present invention also provides a decision feedback apparatus which may be advantageously employed for example in a communications transceiver. A combiner combines a first received signal with a feedback signal. A symbol detector detects an output signal from the combiner and decides a symbol value corresponding to the magnitude of that output signal. A signal differencer determines a symbol error based on the combiner output signal and the decided symbol value. The decided symbol values are used to generate the feedback signal which is the estimated value of the ISI.

When the symbol error exceeds an error threshold, a signal processor modifies the feedback signal. More particularly, when the symbol error exceeds the error threshold, the signal processor determines that the symbol value was decided erroneously and temporarily modifies the symbol value. In a preferred embodiment, the temporary symbol value is a closest symbol decision threshold chosen based on the sign of the error.

In accordance with the approach outlined above, the signal processor generates a temporary symbol value in place of the erroneously decided symbol value. When a second signal is received and another symbol value is decided corresponding to the second received signal, the signal processor determines another symbol error for a decided symbol value resulting from the use of the temporary symbol value. The signal processor then determines a correct symbol value for the first received signal using that other symbol error. Also in the preferred example embodiment, the error threshold is calculated based on an expected bit error rate and a first postcursor of an impulse response of the communications channel over which the signals are received.

While the present invention may advantageously be applied to digital communications systems, such as to the non-limiting ISDN transceiver example used below in the detailed description, the present invention has much wider general applicability. In particular, the present invention may be employed in equalizers in any application. A better understanding of the features and advantages of the present invention will be obtained by reference to the following detailed description of the invention and the accompanying drawings which set forth an illustrative, non-limiting embodiment in which the principles of the present invention are utilized.

DETAILED DESCRIPTION OF THE DRAWINGS

In the following description, for purposes of explanation and not limitation, specific details are set forth, such as specific interfaces, hardware embodiments, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 3:
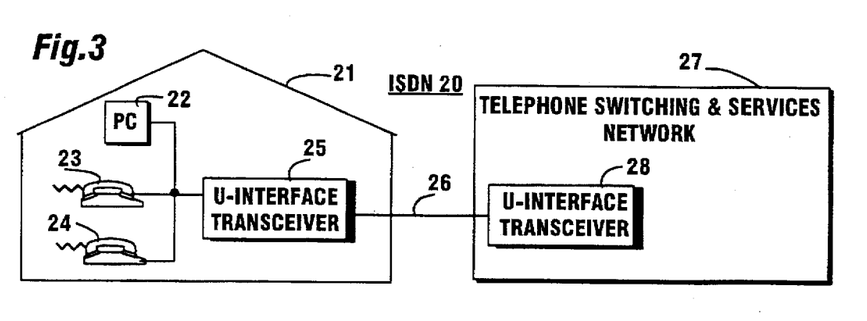
FIG. 3 is a function block diagram of an example application of the present invention to a digital ISDN communications system.

FIG. 3 shows an overall block diagram of an example application of the present invention to a data communications environment, and more specifically, to an integrated services digital network (ISDN) 20. However and as mentioned above, the present invention may be used advantageously in any application that uses decision feedback equalization.

A building 21 may, for example, include telephone subscribers (23 and 24) and data subscribers (personal computer 22) linked over a local area network to a U-transceiver 25 (via an S-transceiver not shown). The U-transceiver 25 is connected by a two-wire "subscriber loop." Transmission line 26 to another U-interface transceiver 28 at telephone switching and services network 27 which provides digital switching and other messaging-call processing services.

For purposes of illustration and description only, the present invention is described hereafter in the context of such an ISDN network that uses U-transceivers and 2B1Q line codes. In the ISDN, the 2-binary, 1-quaternary (2B1Q) line code is used which employs a four level, pulse amplitude modulation (PAM), non-redundant code. Each pair of binary bits of information to be transmitted is converted to a quaternary symbol (-3, -1, +1, and +3). For example, "00" is coded to a -3, "01" is coded to a -1, "10" is coded to a +3, and "11" is coded to a +1. However, as will be appreciated by those skilled in the art, the present invention may be applied to other types of data communication networks and other types of line codes/symbols.

Figure 4:
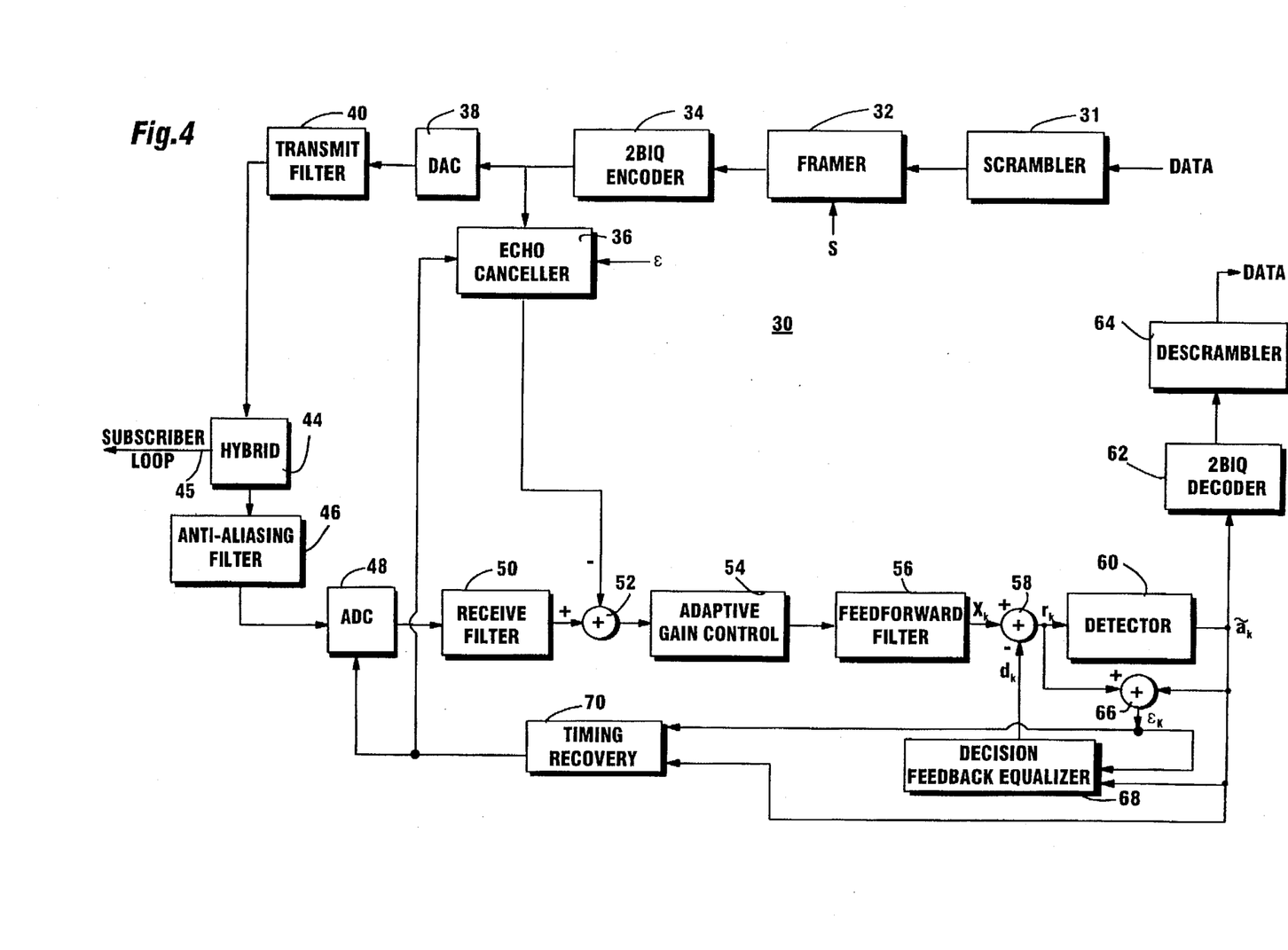
FIG. 4 is a function block diagram of a U-type transceiver that may be used in an ISDN communications system.

Reference is now made to FIG. 4 which illustrates a U-interface transceiver 30 comprising a transmitter and receiver. Again, although the present application is being described in conjunction with a U-interface transceiver for use in conjunction with an ISDN digital communications network, the present invention of course could be applied to other DFE applications. Binary data for transmission is applied to a scrambler 31 which encodes the data into pseudo-random bit stream formatted by a framer 32 into frames of 240 bits or 120 (2B1Q) symbols in accordance with ISDN specification T1D1. The framer inserts a 9-symbol signaling word used for frame synchronization in each frame of data so that 111 symbols are left for the scrambled data.

The flamed and scrambled binary signal is applied to a 2B1Q encoder where it is converted into a parallel format by a serial-to-parallel converter which produces digits in the combinations of 00, 01, 10, and 11. Digit-to-symbol mapping in the encoder produces the four corresponding symbol levels -1, +1, -3, and +3. Digital-to-analog converter (DAC) 38 converts the encoded signal to a voltage level suitable for application to the hybrid 44 which is connected to subscriber loop 45. The transmit filter 40 removes high frequencies from the digital pulses output by the digital-to-analog converter 38 to reduce cross-talk and electromagnetic interference that occur during transmission over the subscriber loop 45.

Incoming signals from the subscriber loop 45 are transformed in hybrid 44 and processed by the receiver which, at a general level, synchronizes its receiver clock with the transmitter clock (not shown) so that the received signal can be sampled at the symbol/baud transmission rate, i.e., the rate at which symbols were transmitted at the far end of the loop. The received signal is converted into a digital format using analog-to-digital converter (ADC) 48. The sampling rate of the analog-to-digital converter 48, which is tied to the receiver clock, is adjusted using a control signal from timing recovery circuit 70. For example, A-to-D converter 48 may sample at a sampling rate of 80 kHz even though it has a built-in higher frequency clock permitting phase adjustment in smaller intervals, e.g., a period of 15.36 MHz.

The digitized samples are filtered by a receive filter 50, the output of which is provided to summing block 52. Receive filter 50 increases the signal-to-noise ratio of the received signal by suppressing the "tail" of the received signal. The other input to summer 52 is an output from echo canceller 36. As described above, pulses transmitted onto subscriber loop 45 result in echo on the receiver side of the hybrid 44 due to impedance mismatch. Unfortunately, it is difficult to separate the echoes of these transmitted pulses (using for example a filter) from the pulses being received from subscriber loop 45. Accordingly, echo canceller 36 generates a replica of the transmitted pulse waveform and subtracts it at summer 52 from the received pulses. The echo canceller is adjusted based upon an error signal between the received symbol and the detected symbol output at summer 66. Such an adaptive echo canceller is typically realized as a traversal, finite impulse response (FIR) filter whose impulse response is adapted to the impulse response of the echo path. The error is used to adjust the filter coefficients to "converge" the filter's response to the impulse response model of the communications channel.

The echo cancelled signal is processed by adaptive gain controller 54 to adjust the amplitude to levels specified for the symbols in the 2B1Q line code. In general, the gain applied to the input signal is adapted by comparison of the input signal to fixed amplitude thresholds and increasing or decreasing the gain as necessary to achieve the amplitudes standardized for symbols -3, -1, +1, and +3. The output of the adaptive gain controller is provided to a feedforward filter 56 which in physical terms enhances high frequencies of pulses in the received signal which translates into an increase in the steepness or slope of the rising edge of the digital pulse. In functional terms, known digital communications systems refer to this feedforward filter 56 as a precursor filter because its purpose is to suppress the precursor portion of received pulses.

The output of feedforward filter 56 $x_k$ from FIG. 4 is input to the combiner 58 which removes from signal $x_k$ the output of decision feedback equalizer 68. Decision feedback equalizer 68 receives as inputs a symbol error $\epsilon_k$ from differencer 66 and the detected symbol $\alpha_k$ generated by detector 60. The operation of the decision feedback equalizer 68 is described in further detail below. Symbols detected by detector 60 are decoded and descrambled in 2B1Q decoder 62 into scrambler 64, respectively, which perform the inverse operations of 2B1Q encoder 34 and scrambler 31. Ultimately the underlying data to be received is generated by descrambler 64.

As described above, the decision feedback equalizer uses past symbol decisions to synthesize and subtract from the current received signal sample $x_k$ an intersymbol interference (ISI) estimate $$d_k = \sum_{i=1}^{N} \tilde{h}_i \tilde{a}_{k-i}$$

The symbol error $\epsilon_k$ can be mathematically described as the difference between the received signal sample $x_k$, the ISI estimate $d_k$, and a decision about the actual symbol value $\tilde{h}_0 \alpha_k$ as follows:

$$\epsilon_k = x_k - d_k - \tilde{h}_0 \tilde{a}_k + \eta_k = \sum_{-\infty}^{\infty} \tilde{h}_i \tilde{a}_{k-i} - \tilde{h}_0 \tilde{a}_k - \sum_{i=1}^{N} \tilde{h}_i \tilde{a}_{k-1} + \eta_k = \quad (1)$$

$$= \sum_{i=-\infty}^{i=-1} h_i a_{k-i} + h_0(a_k - \tilde{a}_k) + \sum_{i=1}^{N} h_i(a_{k-i} - \tilde{a}_{k-i}) +$$

$$+ \sum_{i=0}^{N} (h_i - \tilde{h}_i) \tilde{a}_{k-i} + \sum_{i=N+1}^{\infty} h_i a_{k-i} + \eta_k$$

The variables $\alpha_k$ and $\tilde{\alpha}_k$ are received data symbols and recovered data symbols, respectively; $h_i$, and $\tilde{h}_i$ are the true and estimated values of the impulse response of the channel, respectively, where the estimated values of the channel impulse response (sometimes referred to as "cursors") are the DFE filter coefficients; $(h_i - \tilde{h}_i)$ therefore is the corresponding error in the estimate of the channel impulse response; $\eta_k$ represents the external noise; and N is the number of taps in the DFE such as the DFE shown in FIG. 2. The pulse shape $h_i$ made up of precursors ($h_{-1}$, $h_{-2}$, $h_{-3}$, ...) and postcursors ($h_1$, $h_2$, $h_3$, ...) along with a main cursor $h_0$ is generally not known because it results from an overall transfer function including the transmission medium, receive filter, etc. The sampled impulse response function is subsequently estimated using an adaptive finite impulse response (FIR) filter such as the transversal filter 12 in FIGS. 1 and 2. The sampled signal value at the current decision instant $t_k$ corresponds to the main cursor $h_0$ Since each connection between two transceivers in a network is very likely to have a different channel transfer function, and since each channel's characteristics varies with time and are generally corrupted by noise, a received pulse is "spread" and therefore interferes with later received symbols. In other words, a pulse value of $x_k$ for time instance $t_k$ is $\alpha_k h_0$, at time instance $t_{k-1}$ is $\alpha_k h_1$, etc., where $\alpha_k$ is the symbol amplitude and $h_0$, $h_1$, ... are the "cursor" values generated by the channel impulse response where $h_0$ is the main pulse cursor, $h_1$ is the first postcursor, $h_2$ is the second postcursor, $h_{-1}$ is the first precursor, etc. At time instance $t_{k+1}$, the pulse value for the next received pulse $X_{k+1}$ is $\alpha_{k+1} h_0 + \alpha_k h_1 + \ldots$ other terms that represent postcursor interfering components from previously received symbols. The term $a_k h_1$ is the first postcursor of the symbol just previously received at symbol time $t_k$. But more completely $$x_k = \sum_{-\infty}^{\infty} h_i a_{k-1} \quad (2)$$

Returning to equation (1) above, the last three terms represent noise and are ignored for the following analysis, i.e., those terms are assumed to be small enough so that the BER requirement for the digital transmission system is met. The first term relates to the precursor and the second term to the main cursor components of the received sample. The third term, which will now be defined as $\epsilon_k$, denotes the contribution to the symbol estimation error $\epsilon_k$ due to incorrect previous DFE symbol value decisions:

$$e_k = \sum_{i=1}^{N} h_i(a_{k-i} - \tilde{a}_{k-i}) \quad (3)$$

Therefore, equation (1) can be rewritten as $$\epsilon_k = h_o(\alpha_k - \alpha_k) + e_k + \eta'_k \quad (4)$$

In a normal steady-state and error-free mode of operation, this error term $e_k$ is equal to zero.

A variable $\Delta$ in accordance with the present invention is defined as the "decision distance" and refers to the separation of the actual symbol value $\alpha_k$ from the corresponding decision thresholds. In the case of a 2B1Q line code, $\Delta=1$. The symbol $\alpha_k$ may be wrongly determined if $$\left| \sum_{-\infty}^{i=-1} h_i a_{k-i} + \sum_{i=0}^{N} (h_i - \tilde{h}_i) \tilde{a}_{k-i} + \sum_{i=N+1}^{\infty} h_i a_{k-i} + \eta_k \right| \geq \Delta \quad (5)$$

It is well justified in practice to assume that the probability density function of superimposed noise, $\eta'_k$ is symmetrical, and thus the decision distance $\Delta$ is half of the symbol distance. Further, if incorrectly detected, the subsequent postcursors are not subtracted but instead are doubled in a subsequent time instance. For example, a single erroneous decision made in time instance $t_k$ causes $$e_{k+1} = h_1(\alpha_k - \tilde{\alpha}_k) = \pm 2 \Delta h_1 \quad (6)$$

Figure 5:
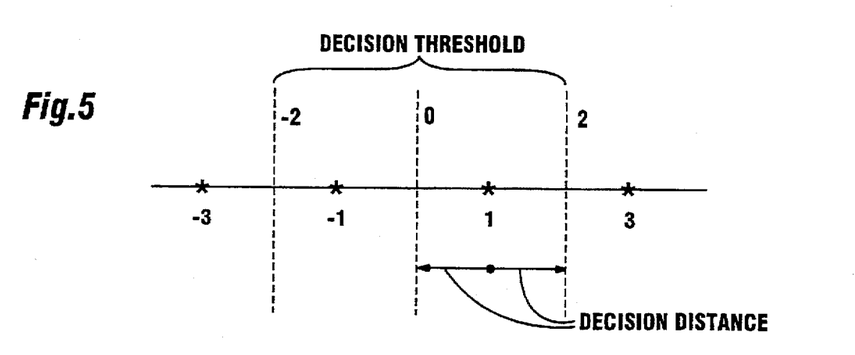
FIG. 5 is a drawing illustrating a decision distance in the context of a 2B1Q line code example in accordance with the example application of the present invention to an ISDN communications system.

The decision distance of the 2B1Q line code is equal to 1 as shown in FIG. 5. The symbol value lies in the middle of the decision thresholds, e.g., 1 is the middle of the interval 0–2. This arrangement gives the best chance to avoid an erroneous decision if the superimposed noise is symmetrical. If the noise were asymmetrical, the decision thresholds would not be symmetrical about symbol value. The distance between the symbols is equal to two decision distances. The simple numerical example is 2B1Q line code. The symbols are: −3, −1, +1, +3, then the distance between two nearest symbols is 2. The decision distance is therefore 1. It is assumed that the probability of making a symbol decision −3 when the symbol is actually +1 is practically non-existent. Therefore, the only considered decision errors are those deciding in favor of the nearest symbol, i.e., $\alpha_k - \tilde{\alpha}_k = \pm 2\Delta$. In essence, the decision distance can be interpreted as a maximum allowable error where the correct decision still be made.

Accordingly, the probability of an incorrect decision for the symbol immediately following the single, erroneously identified symbol depends essentially on whether the first feedback filter coefficient corresponding to $h_1$ is less than ½.

$$|e_{k+1}|=|2\Delta h_1|<\Delta \qquad (7)$$

The same condition applies to all filter coefficients as a symbol decision error propagates through the filter.

Accordingly, if $$|\tilde{h}_i| \cong |h_i| < \frac{1}{2} \qquad (8)$$

for i=1... N, the probability of subsequent incorrect decisions due to decision error propagation is equal to zero in the absence of other noise sources.

An example of decision distance A is provided in the context of the 2B1Q line code example. An erroneous symbol decision may be triggered when a "1" is accompanied by an error of 1.1. Accordingly, the received signal $x_k$ equals 2.1, and the symbol decision "3" is made because 2.1 is closer to 3 than it is to 1. The symbol estimation error $\epsilon_k$ is 2.1–3.0=–0.09. This erroneous decision is used by the DFE feedback filter to synthesize the ISI and subtract the ISI from the next sample, $x_{k+1}$. In this example, $3h_1$ is subtracted from $x_{k+1}$ instead of simply $1h_1$, i.e., $2h_1$ too much. If the magnitude of $2h_1$ is greater than the decision distance, another wrong decision is made.

Referring to FIG. 5, the decision distance between each symbol –3, –1, +1, and +3 and a decision threshold –2, 0, and +2 is 1. Therefore, if the signal amplitude $\alpha_k$ is between 0 and 2, a symbol decision of 1 is made. If the magnitude of the first postcursor $h_1$ of the channel impulse response is less than 0.5 (see equations (7) and (8)), and assuming that $2h_1$ is the only source of error, a correct symbol decision will likely be made. Conversely, if the magnitude of $h_1>0.5$, then a wrong symbol decision will likely be made. As an example, assume $h_1=0.6$, then $2h_1=1.2$. The value 1.2 falls outside the decision $\Delta$ equals 1, and 1+1.2=2.2 will wrongly be decided as a "3" rather than a "1". A single DFE generated error increases the likelihood of future estimation errors, two following errors increase it even more, and so on.

Based on the observations outlined above, the inventor of the present invention formulated the following: if the time instance when an erroneous decision is made can be identified, and if the true symbol value can be recovered, then the DFE-generated erroneous decision and resulting DFE propagated errors will be prevented. As one way of implementing this formulation, an error threshold $\epsilon_t$ may be defined to compare with the decision estimation error. If the estimation error is less than the threshold $\epsilon_t$, an assumption is made that the DFE is functioning correctly. If the estimation error exceeds the threshold value, the actual symbol decision is analyzed to determine whether it was correctly made. To perform this analysis, the symbol decision being analyzed is temporarily replaced with an "artificial" symbol value corresponding for example to one of the decision thresholds between potential symbol values such as –2, 0, and 2 shown in FIG. 5. These temporary symbol values, being something other than the actual symbol values –3, –1, +1, and +3, will generate a decision error in the next time instance $t_{k+1}$ when the next received symbol sample is analyzed. The relationship between the equalization error determined in $t_k$ and the decision error caused as a result of adopting the artificial temporary symbol decision is used to determine the correct symbol value for $\alpha_k$ for time instant $t_k$.

Replacing a detected symbol value with a temporal symbol value is now illustrated using the example of the 2B1Q line code. Of course, the present invention may be applied to other codes as well. As already described, the 2B1Q code consists of four symbols, {–3, 1, +1, and +3}, and the symbol decision distance $\Delta$ is equal to "1".

In order to avoid the significantly increased risk of a series of self-sustained incorrect decisions, the detected symbol value (presumably but not surely erroneous) is replaced with a temporal value chosen to prevent a decision error propagation. An appropriate temporal value is chosen from detector thresholds which separate the symbol decision for the 2B1Q line code corresponding to –2, 0, and 2. Referring to equation (6) above, the advantage of using this set of temporary symbol values is that the symbol distance between the true symbol values –3, –1, +1, and +3, and temporary symbol values (–2, 0, and 2) is less than the distance between the true symbol values and the initially identified erroneous symbol, e.g., the difference between +1 and +2 is 1, whereas the difference between +1 and +3 is 2. Therefore in this example of a 2B1Q line code where $\Delta=1$ and the temporary values are –2, 0, and 2, equation (6) is reduced as follows:

$$\begin{aligned} e_{k+1} &= h_1(a_k - a_k(\text{temp})) \\ &= h_1\Delta\text{sign}(a_k - a_k) \\ &= h_1\text{sign}(a_k - a_k) \end{aligned} \qquad (6)'$$

Of course, the main cursor $h_0$ is the largest cursor value of the channel impulse response $h_i$. For a 2B1Q code and without the loss of generality, it may be assumed that $$h_0=\Delta=1>|h_i| \qquad (9)$$

for i=1... N. In other words, $h_0$ is the largest cursor, e.g., $h_0=1$, $h_1=0.9$, etc.

Thus, by appropriately choosing temporary symbol values to replace symbol values that are probably wrong, DFE-generated decision errors are prevented from following the first erroneous symbol decision. In other words, this temporary symbol substitution prevents error propagation through the DFE. Since the symbol values –2, 0, and 2 do not exist (–3, –1, +1, and +3 are the only possible symbols), the true symbol value may be easily determined by detecting the sign (+or –) of $\epsilon_{k+1}$ which is approximately $e_{k+1}$ if external noise is assumed to be zero or near zero.

For this 2B1Q line code example, the errors $\epsilon_k$ and $\epsilon_{k+1}$ for various possible situations are illustrated in Table 1 below, along with the corresponding temporal values during the symbol value correction. Note that extreme threshold values –4 and +4 have been employed to demonstrate the completeness of this algorithm. It is easy to observe from Table 1 that increasing or decreasing the symbol decision value $\alpha_k$ by the decision distance $\Delta$, i.e., "1" in this example, according to the sign of the error $\epsilon_{k+1}$ leads to the true symbol value. The sign of the $h_1$ which is also taken into account is readily available from the first tap of the adaptive feedback filter as shown for example in FIG. 7 described below. This is because the error $\epsilon_{k+1}$ depends on whether the temporary symbol value is greater than or less than the true symbol value, i.e., an error of positive or negative $h_1$, which is apparent from equation (6)' above.

TABLE 1

Error $\epsilon_k$ as a function of the symbol value decision and a temporary symbol value

| True Symbol value $\tilde{\alpha}_k$ | Symbol Decision $\hat{\alpha}_k$ | Sign of error $\epsilon_k$ as compared to an error threshold $\epsilon_t$ | Temporary symbol value assigned $\tilde{\alpha}_k$ (temp) | Sign of error $\epsilon_{k+1} \equiv \epsilon_{k+1}$ | Corrected value of $\tilde{\alpha}_k$ for the 2B1Q line code example |
|---|---|---|---|---|---|
| +3 | +3 | (−) | +2 | sign(+h₁) | 2 + 1 = 3 |
|    |    | (+) | +4 | sign(−h₁) | 4 − 1 = 3 |
|    | +1 | (+) | +2 | sign(+h₁) | 2 + 1 = 3 |
| +1 | +3 | (−) | +2 | sign(−h₁) | 2 − 1 = 1 |
|    | +1 | (−) | 0  | sign(+h₁) | 0 + 1 = 1 |
|    |    | (+) | +2 | sign(−h₁) | 2 − 1 = 1 |
|    | −1 | (+) | 0  | sign(+h₁) | 0 + 1 = 0 |
| −1 | +1 | (−) | 0  | sign(−h₁) | −2 + 1 = −1 |
|    | −1 | (−) | −2 | sign(+h₁) | −2 + 1 = −1 |
|    |    | (+) | 0  | sign(−h₁) | 0 − 1 = −1 |
|    | −3 | (+) | −2 | sign(+h₁) | −2 + 1 = −1 |
| −3 | −1 | (−) | −2 | sign(−h₁) | −2 − 1 = −3 |
|    | −3 | (−) | −4 | sign(+h₁) | −4 + 1 = −3 |
|    |    | (+) | −2 | sign(−h₁) | −2 − 1 = −3 |

Accordingly, one preferred approach for analyzing symbol decisions begins with identifying dubious symbol decisions when $|\epsilon_k| > \epsilon_t$. Second, a temporary symbol value nearest the symbol decision is used instead of the detected value in order to prevent possible error propagation. Third, the error caused by that temporary substitution is determined and used to correct the temporary symbol value to the correct value. More formally, if the criterion $|\epsilon_k| > \epsilon_t$ is fulfilled, the detected symbol value is changed according to the expression below:

$$\tilde{\alpha}_k(\text{temp}) = \hat{\alpha}_k + \text{sign}(\epsilon_k) \cdot \Delta = \hat{\alpha}_k + \text{sign}(\epsilon_k) \tag{10}$$

where $\Delta = 1$ for the 2B1Q line code example. Substituting the temporary symbol value $\tilde{\alpha}_k(\text{temp})$ for $\hat{\alpha}_k$ prevents decision error propagation through the DFE. In the next clock cycle or time instant $t_{k+1}$, the symbol value is changed to its final value:

$$\begin{aligned}\tilde{a}(\text{fin}) &= \tilde{a}_k(\text{temp}) + \text{sign}(\epsilon_{k+1}) \cdot \text{sign}(h_1) \cdot \Delta \\ &= \tilde{a}_k(\text{temp}) + \text{sign}(\epsilon_{k+1}) \cdot \text{sign}(h_1)\end{aligned} \tag{11}$$

Where $\Delta = 1$ for the 2B1Q line code example. The final symbol value $\tilde{\alpha}_k(\text{fin})$, in a noiseless case, is the true symbol value. Therefore, the correct data sequence is retrieved just one clock cycle later; only two clock cycles are needed to recover correct symbol value. During the correction of the symbol value, the feedback filter coefficients may be updated. This preferred approach works extremely well for received signals having a relatively high signal-to-noise ratio (SNR), e.g., when the residual noise is about 30 dB under the signal level.

While different criteria may be used to establish a suitable error threshold $\epsilon_t$, a preferable threshold $\epsilon_t$ is determined as a function of desired Symbol rate and the first postcursor $h_1$. The inventor recognized that $h_1$ is the first source of error. To prevent any further error, action needs to be immediate. The magnitude of $h_1$ is therefore generally the condition by which the threshold may be determined in the preferred example (i.e., non-limiting) embodiment. However, there are instances when it is conceivable that $h_1$ might be very small or even zero (as in the instance where the impulse response function is the zero crossing one sampling interval after the optimum sampling instance) followed by a nonzero second cursor $h_2$. In this situation, the erroneous decision occurs not at $t_{k+1}$, which is typically the case because $h_1$ is usually relatively large, but at $t_{k+2}$ where the erroneous decision is multiplied by $h_2$ causing decision error propagation. Thus, in more general terms, the preferred embodiment corrects a questionable symbol decision value when the magnitude of a first one of the cursors $h_i$ exceeds 0.5. Thus, the use of the first postcursor $h_1$, although often applicable, is nevertheless a non-limiting illustrative example.

Figure 6:
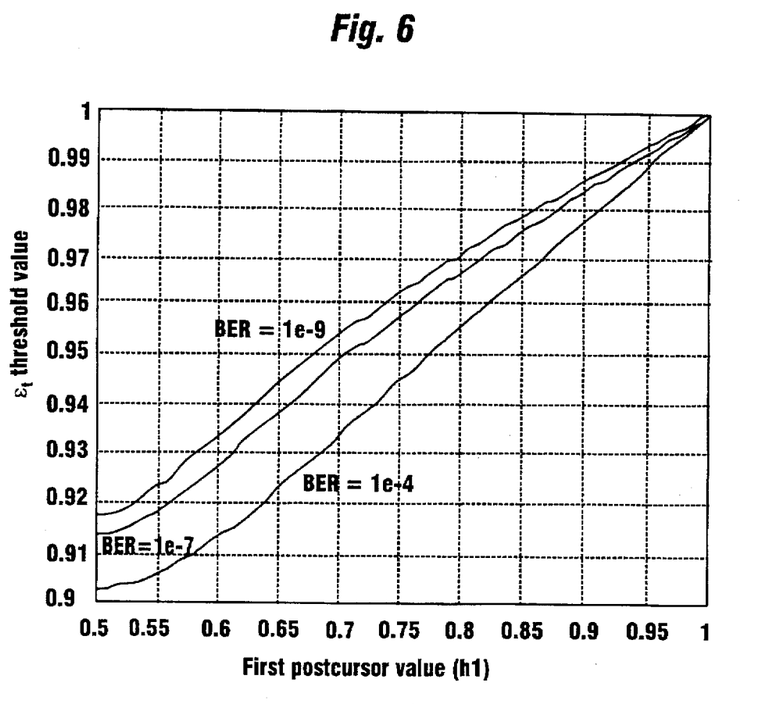
FIG. 6 is a graph illustrating one example of determining an optimum threshold value $\epsilon_r$ as a function of first symbol postcursor $h_1$ and expected bit error rate.

A graph illustrating threshold $\epsilon_t$ as a function of bit error rate and first postcursor value $h_1$ is shown in FIG. 6. Since the desired bit error rate is known and the first postcursor value $h_1$ can be determined with a reasonable degree of certainty for particular communications channels, an optimal threshold value $\epsilon_t$ can be appropriately determined for a particular communication using for example a lookup table that contains information similar to that contained in the graph of FIG. 6.

Figure 7:
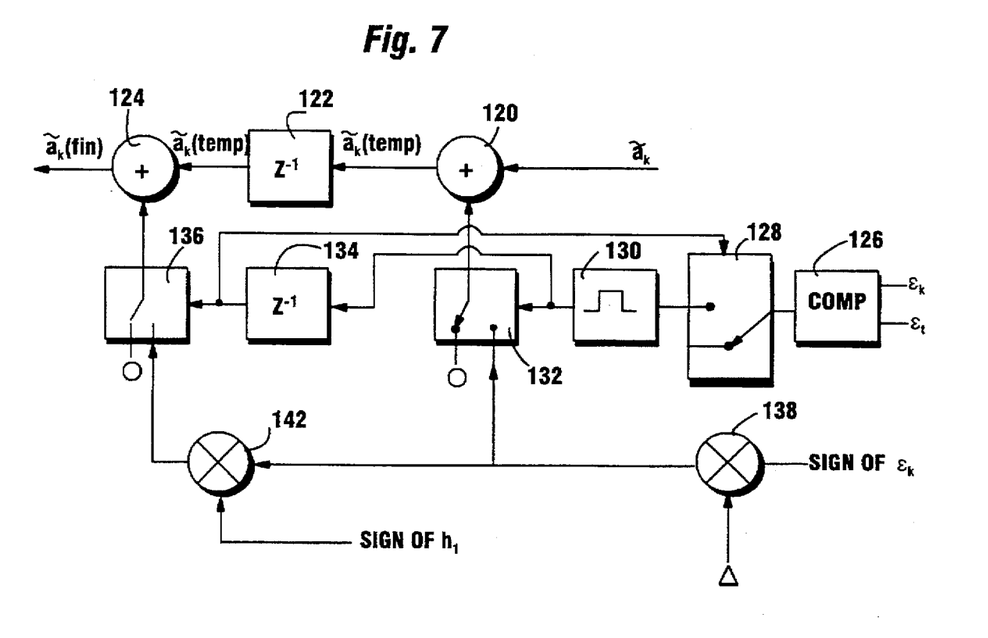
FIG. 7 is a function block diagram illustrating an example hardware implementation of the present invention over two symbol periods.

The present invention may be readily implemented in hardware and/or software. FIG. 7 shows an example hardware implementation provided to illustrate the symbol correction operation of the present invention over two symbol periods. In essence, the function blocks implement the algorithm set forth in equations (10) and (11). The symbol detector output $\hat{\alpha}_k$ is fed back to the DFE and input to summer 120. The symbol error $\epsilon_k$ is also fed back to a comparator 126 which compares the symbol error $\epsilon_k$ with the error threshold $\epsilon_t$. The output of comparator 126 controls a switch 128 whose output is connected to a pulse generator 130 which generates a pulse having a duration corresponding to the symbol period. When the symbol error $\epsilon_k$ is less than the threshold error $\epsilon_t$, the switch 128 is disconnected, and no pulse is generated. However, if $\epsilon_k$ exceeds $\epsilon_t$, switch 128 connects the comparator output to pulse generator 130 which generates a symbol pulse output at a switch 132 and at a delay element 134. The sign of the symbol error $\epsilon_k$ is multiplied by $\Delta$ in multiplier 138. Of course, if $\Delta = 1$, as it does for a 2B1Q line code, then the hardware is simplified.

The multiplier 138 output is connected via a switch 132 to a summer 120 during that symbol pulse period to generate at the summer output the temporary symbol value $\tilde{\alpha}_k(\text{temp})$ The sign of $\epsilon_k$ is also multiplied in multiplier 142 by the sign of first postcursor $h_1$ from multiplier 140 (assuming $\Delta = 1$ for a 2B1Q line code) and routed to switch 136. Because the output of switch 136 is normally zero, the delayed symbol value for delay element 122 is usually unaffected. However, when a temporary symbol value is adopted, the output from delay element 122 is summed in summer 124 with the product of the sign of $\epsilon_k \cdot \Delta$ and $h_1$ during the next time period $t_{k+1}$. Advantageously, the number of multiplications is reduced when the decision distance $\Delta = 1$ as it is in the 2B1Q line code example.

Figure 8:
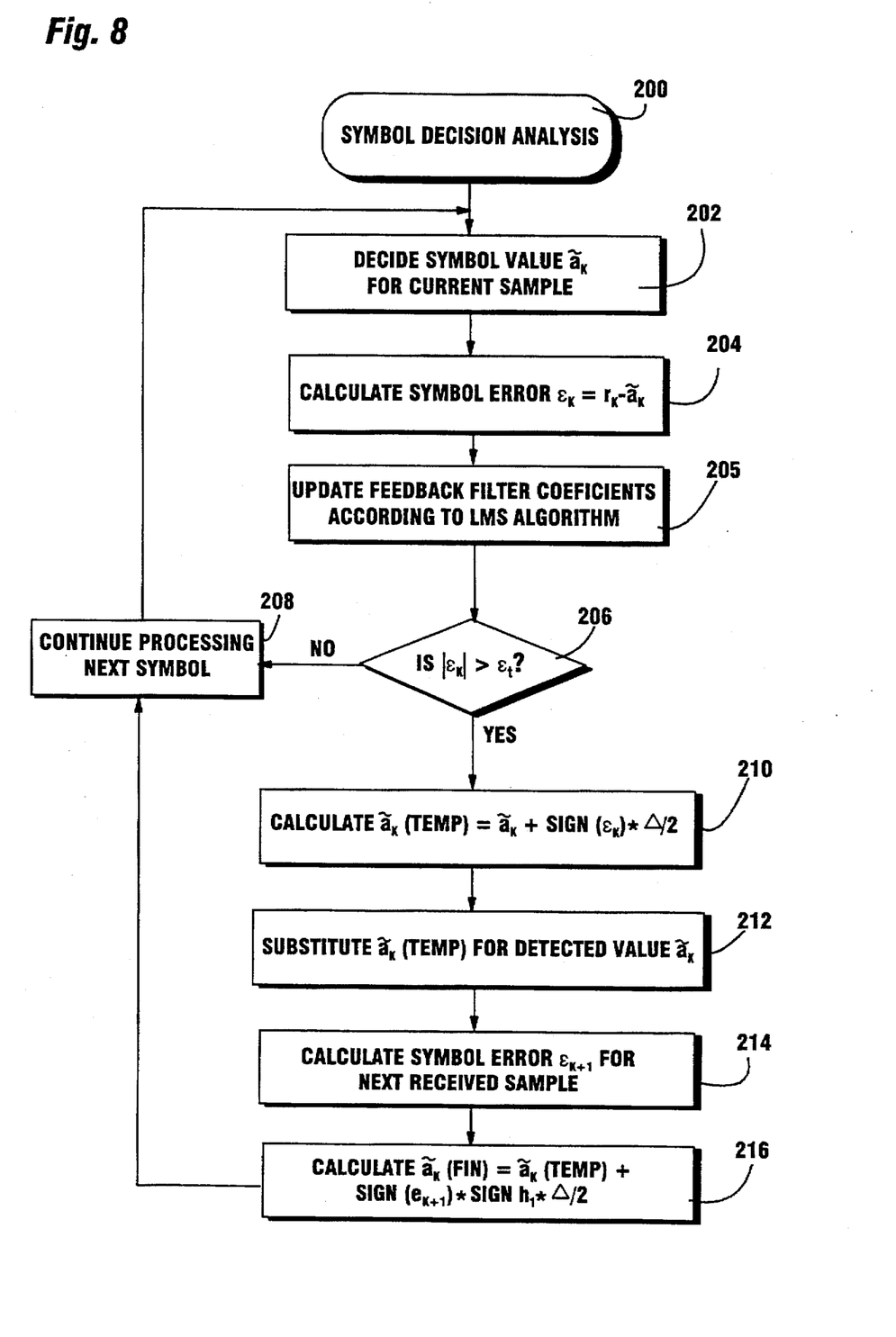
FIG. 8 is a flowchart diagram illustrating a software based example implementation of the present invention.

As will be appreciated by those skilled in the art, the present invention may also be implemented using software or a combination of software and hardware. A suitably programmed microprocessor and/or digital signal processor may implement the example procedures illustrated in flowchart form in FIG. 8 labeled symbol decision analysis (block 200). Initially, a symbol value $\hat{\alpha}_k$ is decided in the symbol detector (block 202). The symbol error $\epsilon_k = r_k - \hat{\alpha}_k$ is then calculated (block 204). The DFE feedback filter coefficients are then updated according to the least mean squares (LMS) algorithm (block 205). A decision is made in block 206 whether the magnitude of the symbol error $\epsilon_k$ is greater than the error threshold $\epsilon_t$. If not, processing of the next symbol is continued (block 208). However, if the magnitude of the symbol error exceeds the threshold error, a temporary symbol value is calculated in accordance with equation (10) (block 210). The temporary symbol value $\alpha_k(\text{temp})$ is then substituted for the detected symbol value $\alpha_k$ (block 212). The symbol error $\epsilon_{k+1}$ for the next received sample is calculated (block 214). Then the final corrected value of the symbol $\alpha_k(\text{fin})$ is determined in accordance with equation (11) (block 216) and processing of the next symbol is continued (block 208).

The preferred example approach for implementing the present invention has some constraints. Referring to Table 1, if an erroneous symbol decision $\alpha_k$ is correctly identified, and if the sign of $\epsilon_{k+1}$ in equation (11) is erroneously identified, the temporary symbol value $\alpha_k(\text{temp})$ is "corrected" to the original decision value $\alpha_k$. In this situation, the DFE correction procedure is "transparent." On the other hand, if a correct symbol decision is for some reason improperly detected as erroneous, the sign of the subsequent $\epsilon_{k+1}$ resulting from that erroneous detection results in an incorrect symbol decision being inserted into the data sequence.

The success of the example decision error detection and correction procedure described above is affected by noise $\eta_k$. The following paragraphs analyze the success rate of the decision.

For the purposes of illustrating the above-described decision error detection and correction procedure in the presence of noise, a test example of the integrated services digital network (ISDN) is used where the desired BER is equal to or less than $10^{-7}$. However, for this test case, even more severe requirements are imposed on an error probability due to accompanying noise. Assume arbitrarily that the noise level that assures that the probability $P_n$ of $|\epsilon_k| \geq \Delta$ not greater than $10^{-9}$ ($p_n = 10^{-9}$), corresponds to the realistic case of a signal-to-noise ratio (SNR) of 22.7 dB. Further, assume that the accompanying noise is white Gaussian. Then, irrespective whether the symbol decision is correct, the probability of an alarm $P_\alpha$ a caused by observable error $\epsilon_k$ being $|\epsilon_k| \geq \epsilon_t$ is $$p_\alpha = p(|\epsilon_k| \geq \epsilon_t) = p(\epsilon_t \leq |\eta_k'| \leq 2\Delta - \epsilon_t) = \quad (12)$$

$$= \frac{3}{4} \cdot 2 \cdot (Q(\epsilon_t) - Q(2\Delta - \epsilon_t))|_{\epsilon_t = 0.975\Delta} = 2.2e-9$$

where $Q(x)$ is the complementary Gaussian Error Integral $$Q(x) = \frac{1}{\sqrt{2\pi}} \int_x^\infty e^{-\frac{u^2}{2}} du \quad (13)$$

The factor ¾ in equation (13) follows from the statistical properties of the 2B1Q line code, i.e., the $|\epsilon_k| > \epsilon_t$ when a "+3" or "−3" is received does not cause a decision error.

The conditional probabilities of making correct or erroneous decisions when an observable error is $\epsilon_k$ is $|\epsilon_k| \geq \epsilon_t$ are respectively:

$$p(\text{correct}|_{|\epsilon_k| \geq \epsilon_t}) = p(\epsilon_t \leq |\eta_k'| \leq \Delta)/p_\alpha|_{\epsilon_t = 0.975\Delta} = 0.71 \quad (14)$$

$$p(\text{error}|_{|\epsilon_k| \geq \epsilon_t}) = p(\Delta \leq |\eta_k'| \leq 2\Delta - \epsilon_t)/p_\alpha|_{\epsilon_t = 0.975\Delta} = 0.29$$

Of all cases when the magnitude of the error exceeds 0.975Δ, 29% of the decisions are wrong. Thus, the chance that the symbol decision is wrong is substantial when $|\epsilon_k| \geq 0.975\Delta$; such large DFE errors therefore may be used to detect the dubious symbol error decisions.

The probability of missing the erroneous decision $P_m$ may be expressed as $$p_m = p(|\eta_k'| \geq 2\Delta - \epsilon_t) = \frac{3}{4} \cdot 2 \cdot Q(2\Delta - \epsilon_t)|_{\epsilon_t = 0.975\Delta} = 0.4e-9 \quad (15)$$

where again, the factor ¾ results from the statistical properties of the 2B1Q line code. Then with the threshold $\epsilon_t$ chosen as in the example above, i.e., $\epsilon_t = 0.975\Delta$, there is a substantial risk of missing the erroneous decision.

Lowering the error threshold $\epsilon_t$ decreases the probability of accepting an incorrect symbol decision as true. At the same time, however, the number of symbol decisions tested to see if the erroneous decision has occurred increases. Increasing the error threshold e, decreases the total number of tested decisions but results in less reliable recovery. The number of the erroneous decisions considered as correct will increase adversely affecting the total decision error probability.

The magnitude of the first postcursor $h_1$ along with the noise level is an important factor influencing performance of the preferred decision error detection and correction procedure. As indicated in Table 1 above, the sign of $\epsilon_{k+1}$ is the only source of making a decision error correction. Observe that if the following relation is not satisfied $$|\epsilon_{k+1}| = |e_{k+1} + \eta_{k+1}| < \Delta \quad (16)$$

the subsequent erroneous decision, $\epsilon_{k+1}$, has a sign opposite of $e_{k+1}$, which causes the previous symbol decision to be restored. In that case, the procedure does not correct the previous decision if it was erroneous. The probability of such event is $$p_f = \begin{cases} 1 - p(-h_1 \leq \eta'_{k+1} \leq \Delta - h_1) & \text{for } h_1 > 0 \\ 1 - p(-(\Delta + h_1) \leq \eta'_{k+1} \leq -h_1) & \text{for } h_1 < 0 \end{cases} \quad (17)$$

Due to the symmetry of the assumed Gaussian distribution of $\eta'_k$, the probability of failure $p_f$ may be expressed as $$p_f = Q(\Delta - |h_1|) + Q(-|h_1|) \quad (18)$$

where the probability of a successful symbol decision correction $$P_s \text{ is } P_s = 1 - P_f \quad (19)$$

To illustrate the influence of the magnitude of the first postcursor $h_1$ on the performance of the symbol decision error detection and analysis procedure in accordance with the present invention, consider a numerical example. Assume a noise level corresponding to BER=$10^{-9}$. If the first postcursor $h_1$ is 0.6, (which is likely in the case for a "short loop"), the probability that the sign of $\epsilon_k$ will be erroneously determined is about 0.01. In the case of $h_1 = 0.9$ (for a "long loop"), the corresponding probability is about 0.28. The latter long loop example indicates the importance of minimizing the largest postcursor $h_1$ of the received signal.

Consequently, the probability of decision error $P_e$ when the above-described symbol decision error detection and analysis procedure is applied may be expressed as $$P_e(P_n, \epsilon_1, h_1) = P_m + P_\alpha \cdot P_f \quad (20)$$

The desired condition is to achieve $P_e > P_n$. The probability of decision error $P_e$ is a function of the accompanying noise level, the chosen threshold $\epsilon_t$, and the magnitude of the first postcursor $h_1$. From equations (12) and (15) above, it is apparent that $P_\alpha$ and $P_m$ depend on the threshold error, and consequently, $P_e$ is a function of the error threshold as well. From equation (17), one sees that $P_f$ depends on $h_1$, and therefore, $P_e$ is also a function of $h_1$. Of course, all probabilities, $P_a$, $P_m$, and $P_f$, depend on noise level. Accordingly, $P_e$ is a function of error threshold, $h_1$, and noise level. This function was evaluated numerically, and the results of that evaluation are described below.

Figure 9:
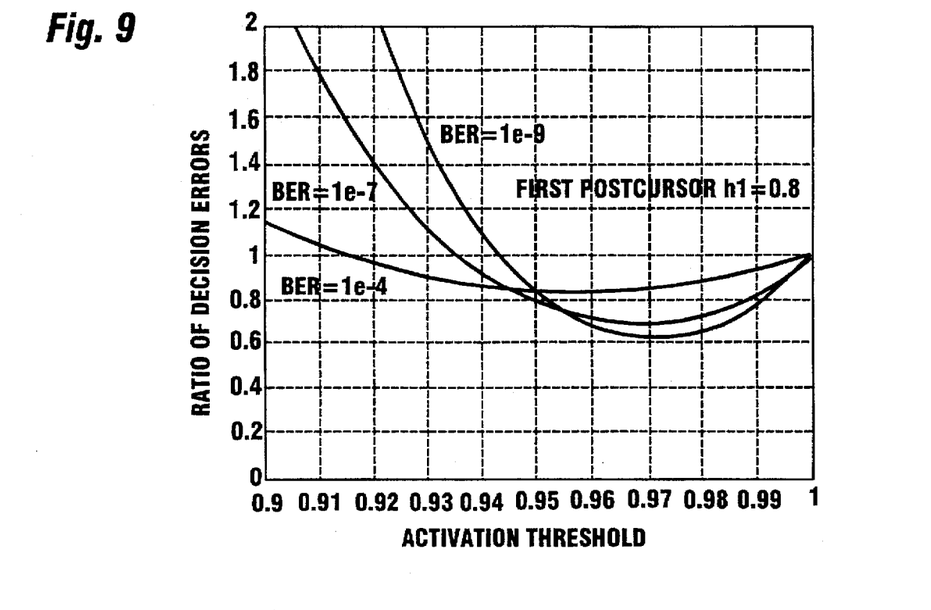
FIGS. 9 and 10 are graphs illustrating statistical properties of the present invention under various conditions.
Figure 10:
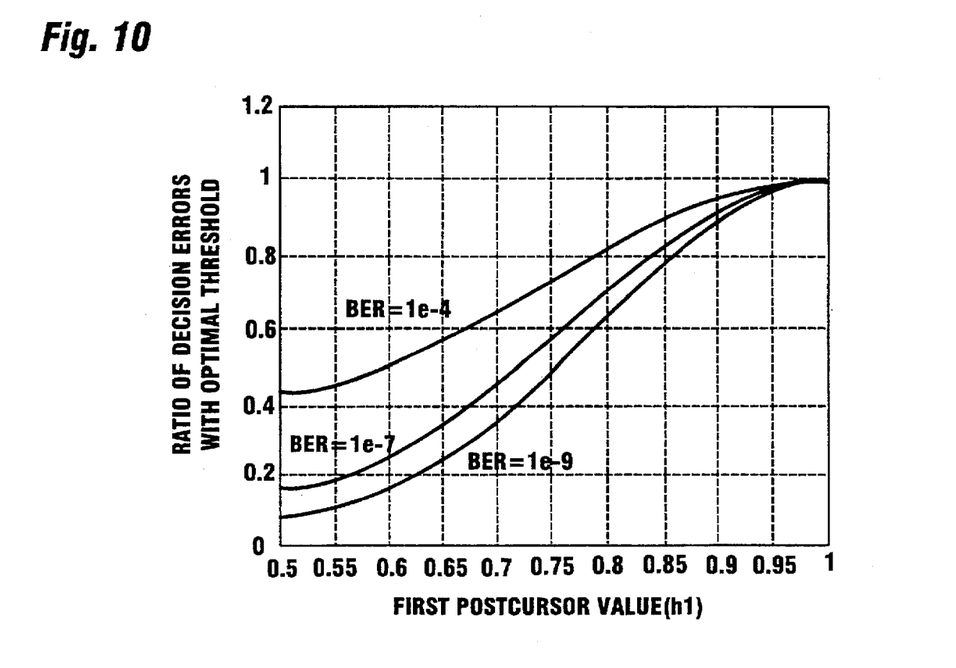

FIG. 9 illustrates how the probability ratio $p_e/p_n$ varies depending on the value of the error threshold $\epsilon_r$. The magnitude of the first postcursor $h_1$ in this example is equal to 0.8. An optimum threshold $\epsilon_r$ and the amount by which the performance may be improved depends on the level of the accompanying noise, equivalently $p_n$. FIG. 10 shows a probability ratio $p_e/p_n$ as a function of first postcursor $h_1$, when an error threshold $\epsilon_r$ determined in accordance with the graph in FIG. 6 is employed. Modest improvement can be achieved for postcursor values $h_1$ near "1".

Accordingly, the present invention advantageously improves the performance of any decision feedback equalizer by first identifying when an erroneous signal value decision has been made and then preventing propagation of that erroneous decision by correcting that decision. Thus, the first postcursor value along with the noise level are important factors in influencing the performance of the symbol decision error detection and analysis in accordance with the present invention. In application to high performance digital communication systems, the present invention provides significant improvement by reducing both bit error rate and the number of data packages which have to be retransmitted due to errors during reception.

While the invention has been described in connection with what is presently considered to be the most practical and preferred embodiments, it is to be understood that the invention is not to be limited to the disclosed embodiment, but contrary, is intended to cover various modifications and equivalent arrangements included within the spirit and scope of the appended claims.

What is claimed is:

1. A signal processing method for reducing an equalization error caused by a decision feedback equalizer (DFE) comprising the steps of:
    (a) processing a received signal;
    (b) determining an intersymbol interference component;
    (c) subtracting from the received signal the intersymbol interference component to generate an equalized signal;
    (d) deciding a current symbol value from the equalized signal;
    (e) calculating a symbol error by subtracting the equalized signal from the decided symbol value;
    (f) based on the symbol error, determining when the current value decision is erroneous; and
    (g) preventing the erroneously decided current symbol value from adversely affecting subsequent symbol value decisions.

2. The method in claim 1, further comprising:
    setting an error threshold,
    wherein the determining step (f) includes comparing the symbol error with the error threshold.

3. The method in claim 2, further comprising:
    if a magnitude of the symbol error is greater than the error threshold, generating a temporary symbol value in place of the current symbol value.

4. The method in claim 3, further comprising:
    processing a next signal sample and deciding a subsequent symbol value corresponding to the next signal sample;

determining a subsequent symbol error for the subsequent symbol value resulting from the use of the temporary symbol value; and determining a correct symbol value for the current sample using the subsequent symbol error.

5. The method in claim 4, wherein the correct symbol value for the current sample is based on whether the subsequent symbol error is negative or positive.

6. The method in claim 2, wherein the processed signal is received over a communications channel and the error threshold is calculated based on a desired symbol error rate and a first post cursor value of an impulse response of the communications channel.

7. The method in claim 3, further comprising:
    determining a decision distance corresponding to a symbol distance between adjacent symbol value; and
    using the decision distance to determine the temporary symbol value.

8. The method in claim 7, further comprising:
    determining the decision distance so that when the decision distance is combined with a potentially erroneously decided symbol value to generate a temporary symbol value, the temporary symbol value is between the potentially erroneously decided symbol value and the correct symbol value.

9. The method in claim 7, wherein the temporary value is determined by combining the erroneously decided symbol value with a first product of a sign of the symbol error and the decision distance.

10. The method in claim 9, wherein a corrected symbol value is determined by combining the temporary symbol value with a second product of the sign of symbol error calculated for the next signal sample processed and the decision distance.

11. The method in claim 10, wherein the processed signal is received over a communications channel and the second product includes the sign of one of the cursors of an impulse response of the communications channel.

12. A signal processing method for processing symbol decisions made by a decision feedback equalizer (DFE) in detecting symbols corresponding to a series of signal samples received over a communications channel in a telecommunications system, comprising the steps of:
    receiving a current signal sample;
    determining in the decision feedback equalizer an intersymbol interference (ISI) component in the current sample;
    subtracting from the current sample the intersymbol interference component to generate an equalized sample;
    deciding a symbol value from the equalized sample; and
    determining whether the symbol value was erroneously decided as a result of the decision feedback equalizer determining an incorrect intersymbol interference component.

13. The method in claim 12, further comprising:
    if a magnitude of a symbol error exceeds an error threshold, confirming that a symbol value decision error has occurred.

14. The method in claim 12, further comprising:
    if a magnitude of the a symbol error exceeds an error threshold, generating a temporary symbol value and using the temporary symbol value in place of the decided symbol value to prevent propagation of the a symbol value decision error to subsequent symbol decisions made by the decision feedback equalizer.

15. The method in claim 14, further comprising:

correcting the temporary symbol value based on an error generated as a result of using the temporary symbol value in place of the decided symbol value.

16. The method in claim 15, wherein the correction of the temporary symbol value is a function of a first post cursor of an impulse response of the communications channel.

17. The method in claim 12, wherein the determination that the symbol value decision is erroneous is a function of a first post cursor of an impulse response of the communications channel.

18. A method for operating a decision feedback equalizer which equalizes a current signal sample for interference caused by other received symbols, comprising the steps of:

detecting when a decision error is made regarding the value decided for the current signal sample, and preventing propagation of the decision error by the decision feedback equalizer in subsequent decisions made regarding the value of subsequent signal samples by correcting the erroneous decision including substituting a temporary value for the decided value.

19. The method in claim 18, wherein the correcting step includes:

determining a subsequent decision error generated as a result of substituting the temporary value for the decided value, and generating a correct value for the current signal sample based on the subsequent error.

20. The method in claim 19, wherein the correct value for the current signal sample is based on whether the subsequent error is negative or positive.

21. The method in claim 18, wherein the detecting step includes:

setting an error threshold;

determining an equalizer error; and comparing the equalizer error with the error threshold.

22. Apparatus comprising:

a combiner combining a feedback signal and a first received signal;

a detector detecting an output signal from the combiner and deciding on a symbol value corresponding to the output signal;

a differencer determining a symbol error based on the combiner output signal and the decided symbol value;

a signal processor processing the decided symbol value based on the symbol error to generate the feedback signal, and when the symbol error exceeds an error threshold, modifying the feedback signal.

23. The apparatus in claim 22, wherein when the symbol error exceeds the error threshold, the signal processor determines that the symbol value was decided erroneously.

24. The apparatus in claim 22, wherein when the symbol error exceeds the error threshold, the signal processor modifies the decided symbol value.

25. The apparatus in claim 24, wherein the modified symbol value is the correct symbol value.

26. The apparatus in claim 22, wherein if the symbol error is greater than the error threshold, the signal processor generates a temporary symbol value in place of the decided symbol value.

27. The apparatus in claim 24, wherein when a second signal is received and another symbol value is decided corresponding to the second received signal, the signal processor determines another symbol error for a decided symbol value resulting from the use of the modified symbol value and determines a correct symbol value for the first received signal using the another symbol error.

28. The apparatus in claim 24, wherein the signal processor uses a decision distance between adjacent symbol values to determine the modified symbol value.

29. The apparatus in claim 22, wherein the first received signal is received over a communications channel and the error threshold is calculated based on an expected symbol error rate and a first post cursor value of an impulse response of the communications channel.

* * * * *